United States Patent
Cusson et al.

(10) Patent No.: US 7,526,481 B1
(45) Date of Patent: Apr. 28, 2009

(54) WEB SERVERS WITH QUERYABLE DYNAMIC CACHES

(75) Inventors: Michael J. Cusson, Chelmsford, MA (US); Ramu Sunkara, Reading, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/294,656

(22) Filed: Apr. 19, 1999

(51) Int. Cl.
*G06F 7/00* (2006.01)
*G06F 17/30* (2006.01)

(52) U.S. Cl. .................... 707/10; 707/104.1
(58) Field of Classification Search ............. 707/1–10, 707/100–104.1, 200–206; 709/240, 223, 709/224; 711/113
See application file for complete search history.

(56) References Cited

U.S. PATENT DOCUMENTS

| | | | | |
|---|---|---|---|---|
| 5,450,581 | A | * | 9/1995 | Bergen et al. ................. 707/9 |
| 5,564,113 | A | * | 10/1996 | Bergen et al. ................. 707/4 |
| 5,623,659 | A | * | 4/1997 | Shi .............................. 707/8 |
| 5,636,355 | A | * | 6/1997 | Ramakrishnan et al. ..... 711/113 |
| 5,806,074 | A | * | 9/1998 | Souder et al. ............... 707/201 |
| 5,838,916 | A | * | 11/1998 | Domenikos et al. ......... 709/219 |
| 5,878,218 | A | * | 3/1999 | Maddalozzo et al. .......... 707/10 |
| 5,920,705 | A | * | 7/1999 | Lyon et al. .................. 709/240 |
| 5,924,096 | A | * | 7/1999 | Draper et al. ................. 707/10 |

(Continued)

FOREIGN PATENT DOCUMENTS

CA 2240600 A1 12/1999

(Continued)

OTHER PUBLICATIONS

Jadav, Divyesh & Gupta, Monish, "Caching Large Database Objects in Web Servers," ECE Department, Syracuse University, IEEE catalog No. 97TB100122, Apr. 7-8, 1997, pp. 10-19.*

(Continued)

*Primary Examiner*—Ella Colbert
(74) *Attorney, Agent, or Firm*—Gordon E. Nelson; Michele Liu Baillie

(57) ABSTRACT

A middle-tier Web server with a queryable cache that contains items from one or more data sources. Items are included in the cache on the basis of the probability of future hits on the items. When the data source determines that an item that has been included in the cache has changed, it sends an update message to the server, which updates the item if it is still included in the cache. As disclosed, the data source is a database system and triggers in the database system are used to generate update messages. The data access layer determines whether a data item required by an application program is in the cache. If it is, the data access layer obtains the data item from the cache; otherwise, it obtains it from the data source. The Web application programs use global data set identifiers to identify data sets, while the cached data sets are identified by local data set identifiers. The cache receives a query context of global data set identifiers, determines whether the data sets of the query context are cached, and if they are, provides the local data set identifiers for the query context to the access layer, which then uses the local data set identifiers to query the cache.

20 Claims, 6 Drawing Sheets

U.S. PATENT DOCUMENTS

| | | | | |
|---|---|---|---|---|
| 6,128,627 | A | * | 10/2000 | Mattis et al. .................. 707/202 |
| 6,167,438 | A | * | 12/2000 | Yates et al. .................. 709/216 |
| 6,173,311 | B1 | * | 1/2001 | Hassett et al. ............... 709/202 |
| 6,205,481 | B1 | * | 3/2001 | Heddaya et al. ............. 709/226 |
| 6,243,715 | B1 | * | 6/2001 | Bogantz et al. ............. 707/201 |
| 6,353,818 | B1 | * | 3/2002 | Carino, Jr. .................... 707/2 |
| 6,466,936 | B1 | | 10/2002 | Ronstrom |
| 2002/0065919 | A1 | | 5/2002 | Taylor et al. |

FOREIGN PATENT DOCUMENTS

| | | |
|---|---|---|
| GB | 2317723 A | 4/1998 |
| WO | WO 99/04535 A | 1/1999 |
| WO | WO 99/17227 A | 4/1999 |

OTHER PUBLICATIONS

*Description of IBM Web Cache Manager product* found at ShopIBM in www.ibm.com as of Mar. 9, 1999. The reference describes prior-art caching techniques used in the World-Wide Web.

*OLE DB/ADO: Making universal data accesss a reality*, Microsoft Corporation, May 1998, found on the Internet at msdn.microsoft.com/library/backgrond/html/msdn_dbado.htm; see in particular the discussion of the Cursor Service and the Synchronization Service at pp. 11-14.

Leverenz, et al., *Oracle8™ Server Concepts, release 8.0*, Oracle Corporation 1997; see in particular Chapter 17, Database Triggers, and Chapter 30, Database Replication.

*IBM Web Cache Manager*, a more detailed discussion of the IBM Web Cache manager found at http://www.storage.ibm.com/hardsoft/products/wcm/webcache.htm on Mar. 9, 1999.

Dar, Shaul, Franklin, Michael j., Jonsson, Bjorn, Srivastava, Divesh, Tan, Michael; "Semantic Data Caching and Replacement" Proceedins of the 22nd VLDB Conference, India, 1996.

Oracle, "Oracle8 Server: Distributed Database Systems", part No. A54653-01, release 8.0, Jun. 1997.

Challenger, J., et al., "Scalable System for Consistently Caching Dynamic web Data"; Proceedings IEEE Infocom '99, Conference on Computer Communica, vol. 1, Mar. 21, 1999, ISBN; 0-7803-5418-4.

Abdelsalam 'Solom' Heddaya; "DynaCache: Weaving Caching into the Internet"; Infolibria, Inc., Jun. 15, 1998, XP002240832.

Porto F. A. M. , et al. "Persistent object synchronization with active relational databases", Technology of Object-Oriented Languages and Systems, 1999. Aug. 1, 1999, XP010348620 ISBN: 0-7695-0278-4.

* cited by examiner

WEB SERVERS WITH QUERYABLE DYNAMIC CACHES

BACKGROUND OF THE INVENTION

1. Field of the Invention

The invention concerns caching of data in networks generally and more specifically concerns the caching of queryable data in network servers.

2. Description of the Prior Art

Once computers were coupled to communications networks, remote access to data became far cheaper and easier than ever before. Remote access remained the domain of specialists, however, since the available user interfaces for remote access were hard to learn and hard to use. The advent of World Wide Web protocols on the Internet has finally made remote access to data available to everyone. A high school student sitting at home can now obtain information about Karlsruhe, Germany from the city's Web site and a lawyer sitting in his or her office can use a computer manufacturer's Web site to determine what features his or her new PC ought to have and then configure, order, and pay for the PC.

A consequence of the new ease of remote access and the new possibilities it offers for information services and commerce has been an enormous increase in the amount of remote access. This has in turn lead to enormous new burdens on the services that provide remote access and the resulting performance problems are part of the reason why the World Wide Web has become the World Wide Wait.

FIG. 1 shows one of the causes of the performance problems. At 101, there is shown the components of the system which make it possible for a user at his or her PC to access an information source via the World Wide Web. Web browser 103 is a PC which is running Web browser software. The Web browser software outputs a universal resource locator (URL) 104 which specifies the location of a page of information in HTML format in the World Wide Web and displays HTML pages to the user. The URL may have associated with it a message containing data to be processed at the site of the URL as part of the process of obtaining the HTML page. For example, if the information is contained in a database, the message may specify a query on the database. The results of the query would then be returned as part of the HTML page. Internet 105 routes the URL 104 and its associated message to the location specified by the URL, namely Web server 107. There, HTML program 109 in Web server 107 makes the HTML page 106 specified by the URL and returns it to Web browser 103. If the message specifies a query on the database in database server 115, HTML program 109 hands the message off to Web application program 111, which translates the message into a query in the form required by data access layer 112.

Data access layer 112 is generally provided by the manufacturer of database server 115. It takes queries written in standard forms such as OLE-DB, ODBC, or JOBC, converts the queries into the form required by database server 115, and places the queries in messages in the form required by network 113. Database server 115 then executes the query and returns the result via network 113 to data access layer 112, which puts the results into the required standard form and returns them to Web application program (WEB APP) 111, which in turn puts the result into the proper format for HTML program 109. HTML program 109 then uses the result in making the HTML page 106 to be returned to browser 103.

As may be seen from the above description, a response to a URL specifying a page whose construction involves database server 115 requires four network hops: one on Internet 105 from browser 103 to Web server 107, one on network 113 from server 107 to server 115, one on network 113 from server 115 to server 107, and one on Internet 105 from server 107 to browser 103. If more than one query is required for an HTML page, there will be a round trip on network 113 for each query.

Moreover, as shown at 117, a typical Web transaction is a series of such responses: the first HTML page includes the URL for a next HTML page, and so forth. The transaction shown at 117 begins with a request for an HTML page that is a form which the suer will fill out to make the query; database server 115 provides the information for the HTML page. When that page is returned, the user fills out the form and when he or she is finished, the browser returns a URL with the query from the form to server 107, which then deals with the query as described above and returns the result in another HTML page. That page permits the user to order, and when the user orders, the result is another query to database server 115, this time, one which updates the records involved in the transaction.

Not only do Web transactions made as shown in FIG. 1 involve many network hops, they also place a tremendous burden on database server 115. For example, if database server 115 belongs to a merchant who sells goods on the Web and the merchant is having a special, many of the transactions will require exactly the same sequence of HTML pages and will execute exactly the same queries, but because system 101 deals with each request from a web browser individually, each query must be individually executed by database server 115.

The problems of system 101 are not new to the designers of computer systems. There are many situations in a computer system where a component of the system needs faster access to data from a given source, and when these situations occur, the performance of the system can be improved if copies of data that is frequently used by the component are kept at a location in the system to which the component has faster access than it has to the source of the data. When such copies exist, the location at which the copies are kept is termed a cache and the data is said to be cached in the system.

Caching is used at many levels in system 101. For example, browser 103 keeps a cache of previously-displayed HTML pages, so that it can provide a previously-displayed HTML page to the user without making a request for the page across Internet 105. Web server 107 similarly may keep a cache of frequently-requested HTML pages, so that it can simply return the page to the user, instead of constructing it. Database server 115, finally, may keep a cache of the information needed to answer frequently-made queries, so that it can return a result more quickly than if it were starting from scratch. In system 101, the most effective use of caching is in Web server 107, since data that is cached there is still accessible to all users of internet 105, while the overhead of the hops on network 113 is avoided.

Any system which includes caches must deal with two problems: maintaining consistency between the data in the cache and the data in the data source and choosing which data to cache. In system 101, the first problem is solved in the simplest way possible: it is the responsibility of the component using the data to determine when it needs a new copy of the data from the data source. Thus, in browser 103, the user will see a cached copy of a previously-viewed HTML page unless the user specifically clicks on his browser's "reload" button. Similarly, it is up to HTML program 109 to determine when it needs to redo the query that provided the results kept in a cached HTML page. The second problem is also simply solved: when a new page is viewed or provided, it replaces the least recently-used cached page.

Database systems such as the Oracle8™ server, manufactured by Oracle Corporation and described in Leverenz, et al., *Oracle8 Server Concepts,* release 8.0, Oracle Corporation, Redwood City, Calif., 1998, move a copy of a database closer to its users by replicating the original database at a location closer to the user. The replicated data base may replicate the entire original or only a part of it. Partial replications of a database are termed table snapshots. Such table snapshots are read-only. The user of the partial replication determines what part of the original database is in the table snapshot. Consistency with the original database is maintained by snapshot refreshes that are made at times that are determined by the user of the table snapshot. In a snapshot refresh, the table snapshot is updated to reflect a more recent state of the portion of the original database contained in the snapshot. For details, see Chapter 30, pages 5-11 of the Leverenz reference. The pages are numbered in the reference as pages 30-5 through 30-11

There are many applications for which the solution of letting the component that is doing the caching decide when it needs a new page causes problems. For example, when the information in a data source is important or is changing rapidly (for example, stock prices), good service to the user requires that the information in the caches closely tracks the information in the data source. Similarly, there are many situations where caching all data that has been requested causes problems. For instance, in a cache run according to least recently-used principles, any HTML page that is produced by HTML program 109 or received in browser 103 is cached and once cached, stays in the cache and takes up space that could be used for other HTML pages until it attains least recently-used status.

When Web server 107 includes a Web application program 111 involving a database server 115, there is still another problem with caching in web server 107: since the data is cached in the form of HTML pages, it is not in queryable form, that is, a cached HTML page may contain data from which another query received from Web browser 103 could be answered, but because the data is contained in an HTML page instead of a database table, it is not in a form to which a query can be applied. Thus, even though the data is in server 107, server 107 must make the query, with the accompanying burden on database server 115 and delays across network 113, and the HTML page containing the result of the query must be separately cached in server 107.

What is needed to solve these problems is a web server 107 that has a cache in which cached data is to the extent possible in queryable form, in which the cached data is dependably updated when the data in the source changes, and in which selection of data from a source for caching is based on something other than the mere fact that a URL received from a web browser referenced the data. It is an object of the invention disclosed herein to provide servers and data sources that solve the above problems.

SUMMARY OF THE INVENTION

The problem of updating the server's cache is solved by having the sources of the cached information send update messages to the server each time the cached information changes in the information source. The problem of determining what to cache is solved by determining what to cache on the basis of probable future requests for the information. The determination of what information will probably be made the subject of future requests can be made in the server, in the data source, or elsewhere.

The problem of queryable data is solved by using a database system in the server as the cache. If the information necessary to run the query is present in the cache database system, the query is run on the cache database system; otherwise, it is run on a source database system. The cache database system is made transparent to application programs running on the server by setting up the data access layer so that it can run queries on either the source database system or the cache database system. The data access layer receives a query in standard form from the application program; it then determines whether the information needed for the query is present in the cache database; if it is, the data access layer runs the query on the cache database; if it is not, the data access layer runs the query on the source database system.

In a further aspect of the invention, the standard form of the query uses global dataset identifiers, while the copies of the datasets in the cache database use local dataset identifiers. A query analyzer in the cache database receives the global dataset identifiers used in the query from the data access layer; if copies are present in the cache, the query analyzer indicates that to the data access layer and returns the local dataset identifiers for the copies to the data access layer. The data access layer then uses the local dataset identifiers to query the cache database.

BRIEF DESCRIPTION OF THE DRAWING

Other objects and advantages will be apparent to those skilled in the arts to which the invention pertains upon perusal of the following Detailed Description and drawing, wherein.

Figure 1:
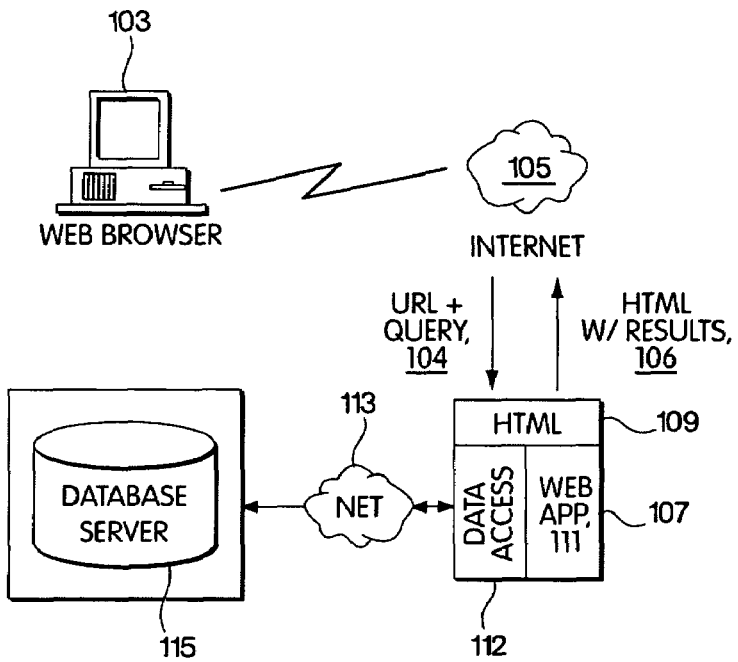
FIG. 1 is an example of a prior-art system for performing queries via the World Wide Web.
Figure 1:
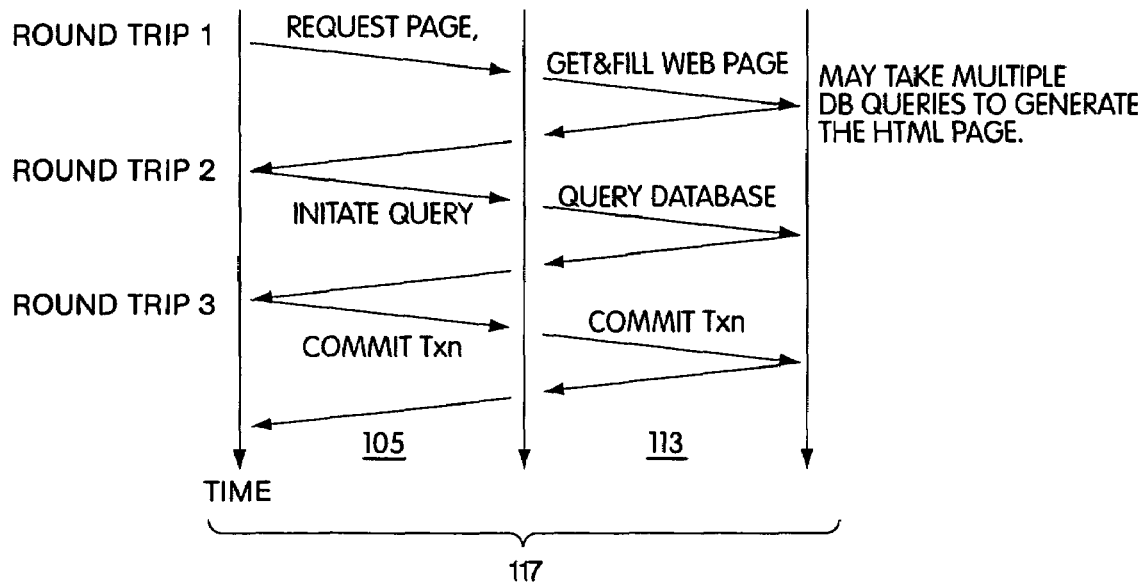

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with a conceptual overview of the invention and will then describe a presently-preferred embodiment of the invention.

Figure 2:
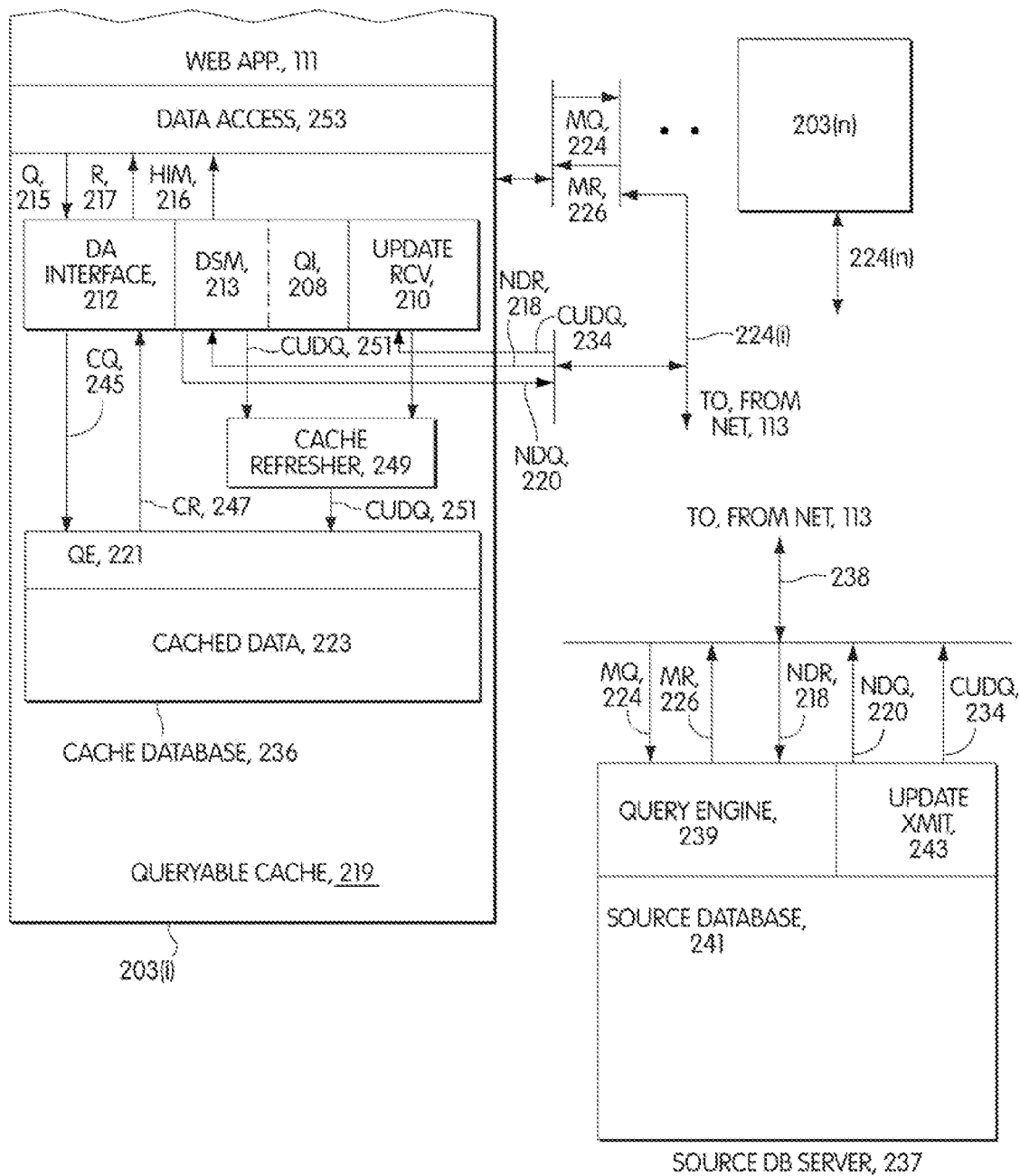
FIG. 2 is a high-level block diagram of a system of the invention.

Overview of the Invention: FIG. 2

FIG. 2 shows a system 201 for retrieving information via a network which includes one or more network servers 203(0 . . . n). A server 203($i$) and another server 203($n$) are shown in FIG. 2. Each server 203($i$) includes a queryable cache 219 that is automatically updated when cached data 223 changes in source database 241 and in which the contents of cached data 223 are determined by an analysis of what queries will most probably be made by users of server 203($i$) in the immediate future. Each of servers 203($i$ . . . $n$) is a Web server 107 as shown in FIG. 1, and thus has an HTML component 109, Web application programs 111, and a data access layer 253 which is a version of data access layer 112 which has been modified to work with queryable cache 219. Server 203 could, however, communicate with its users by any other kind of network protocol. Server 203 further communicates with source database (DB) server 237 by means of network 113, which may use any protocol which is suited to the purpose.

FIG. 2 shows one of servers 203(0 ... n), server 203(i), in detail. As before, Web application program 111 provides a query in a standard form to data access layer 253. Here, however, data access layer 253 has access not only to source database server 237 via network 113, but also to queryable cache 219, which contains a cache database 236 whose cached data 223 is a copy of a portion of the data in source database 241. When data access layer 253 receives a query from Web application program 111, it first presents the query to queryable cache 219, as shown at Q 215. If cached data 223 includes the data specified in the query, queryable cache 219 returns result (R) 217, which data access layer 253 returns to Web application program 111. If cached data 223 does not include the data specified in the query, queryable cache 219 returns a hit or miss (H/M signal 216 indicating a miss to data access layer 253, which then makes the query via network 113 to source database server 237 and when it receives the result, returns it to Web application program 111. The query made in response to the miss signal appears as miss query (MQ) 224 and the response appears as miss response (MR) 226.

It is important to note here that because the interactions with queryable cache 219 and with source database server 237 are both performed by data access layer 253, the existence of queryable cache 219 is completely transparent to Web application program 111. That is, a Web application program 111 that runs on Web server 107 will run without changes on Web server 203(i).

Continuing in more detail with queryable cache 219, the data cached in queryable cache 219 is contained in cache database 236, which, like any database, contains data, in this case, copies of datasets (database tables) from source database 241 that are cached in queryable cache 219, and a query engine (QE 221), which runs queries on the datasets in cached data 223. The portion of queryable cache 219 which receives queries from data access layer 253 is data access interface 212 (DA 212). Data access interface 212 has two functions:

It determines whether the query can be executed on cached data 223 required to execute query 215 and generates miss signal 216 if it does not.

If cached data 223 does contain the data, it puts query 215 into the proper form for cache database 236.

Data access interface 212 makes the determination whether the query can be executed by analyzing the query to determine the query's context, that is, what datasets are required to execute the query and then consulting a description of cached data 223 to determine whether these datasets are present in cached data 223. The datasets are specified in the query by means of dataset identifiers, and consequently, the context is for practical purposes a list of the identifiers for the required data sets. The description 223 of course includes the dataset identifiers for the cached data sets. If the required datasets are present, data access interface 212 makes cache query 245, which has the form required to access the data in cache data base 236. Cache database 236 returns cache result 247, which data access interface 212 puts into the form required for result 217.

Because cached data 223 is contained in cache database 236, cached data 223 is queryable, that is, if a dataset is contained in cached data 223, queryable cache 219 can return as a result not only the entire dataset, but any subset of that dataset that can be described by a query. For example, if cached data 223 includes a dataset that lists all of the kinds of shirts sold by a company engaged in Web commerce and the list of kinds includes the colors that each kind of shirt is available in, queryable cache 219 will be able to handle a query for which the result is a list of the kinds of shirt that are available in red.

Cached data 223 is kept consistent with source database 241 by means of update transmitter (UPDATE XMIT) 243 in source database server 237 and update receiver 210 in queryable cache 219. Whenever a change occurs in source database 241 in a dataset of which there may be a copy in cached data 223, update transmitter 243 generates a cache update query (CUDQ) 234 specifying the change and sends CUDQ 234 via network 113 to each of servers 203(0 ... n). Update receiver 210 receives CUDQ 234 from network 113 and determines from the data set description maintained by data access interface 212 whether the dataset is in fact in cached data 223; if it is, it puts the cache update query into the proper form for cache database 236 and provides it to cache refresher 249, which then runs cache update query (CUDQ) 251 on cache database 236.

Data set manager (DSM) 213 decides generally what copies of datasets from source database server 237 are to be included in cache database 236. The information that DSM 213 uses to make this determination is contained in query information (QI) 208. Query information 208 may be any information available to server 203(i) which can be used to predict what datasets of source database 241 will most probably be queried in the near future. For example, if a company engaged in Web commerce is having a 1-day sale on certain items for which there are datasets in source database 241, query information 208 may indicate the datasets for the items and the time of the 1-day sale. Using that information, DSM 213 can obtain the datasets from source database 241 and cache them in cache database 236 before the beginning of the sale and remove them from cache database 236 after the end of the sale.

Another kind of query information 208 is a query log, a time-stamped log of the queries received from data access layer 253; if the log shows a sharp increase in the occurrence of queries for a given dataset, DSM 213 should cache the datasets for that query in queryable cache 219 if they are not there already. Conversely, if the log shows a sharp decrease in the occurrence of such queries, DSM 213 should consider removing these datasets from queryable cache 219. When DSM 213 determines that a dataset should be added to queryable cache 219, it sends a new data query (NDQ) 220 via network 113 to source database 241 to obtain the new data and when DSM 213 has the response (NDR 218), it sends a delete query to query engine 221 indicating the data to be deleted in cached data 223 to make way for the new data and then sends a cache update query 251 to cache refresher 249 to update the cache.

Data set manager 213 and query information 208 may also be implemented in part in source database server 237 or anywhere where information about the probability of future queries may be obtained. When implemented in source database server 237, the query log would log each query to source database 241 and at least the portion of data set manager 213 which reads the query log to determine what new data needs to be cached would be in source database server 237; when it determined that new data needed to be cached, it would send an update query with the new data to each of the servers 203. The component of DSM 213 that determines what is to be removed could also be in source database server 237, in which case, all queryable caches 219 would contain the same data in cached data 223, or that component could be in each server 203(i), with the component making decisions concerning what data to remove to accommodate the new database on the present situation in server 203(i). In such an arrangement, there can be a local query log in each server 203 in addition to the global query log in source database server 237. Such an arrangement would permit different servers 203 to have different-sized queryable cache 219; it would also permit different servers 203 to take local variations in the queries they are receiving into account in determining what data to remove from queryable cache 219. One way such variations might occur is if system 201 were set up so that different servers 203 preferentially received queries from users in different geographical locations.

FIG. 2 shows only a single source database server 237; there may of course be more than one; moreover, source database server 237 need not be a classical database system. Server 203(*i*) can be set up to be used with data sources containing any kind of queryable data, where queryable is defined as having a form which can be represented as a set of numbered rows of data. Such a set of numbered rows is termed a rowset. Database tables are of course one example of rowsets; others are files of data records, text files, and still and moving image data. If server 203(*i*) is used with data sources having only a single kind of queryable data, queryable cache 219 need only be set up to deal with that kind of queryable data.

If server 203(*i*) is used with data sources having more than one kind of queryable data, cache database 236 may be set up using a rowset representation that will accommodate all of the different kinds of queryable data. In that case, data access interface 212, DSM 213, and update receiver 210 will translate between the results and update queries received from the various data sources and the representations used in cache database 236. In other embodiments, there may be more than one cache database 236 in queryable cache 219, with different cache databases being used for different kinds of queryable data. Again, data access interface 212, DSM 213, and update receiver 210 will perform the necessary translations.

Figure 3:
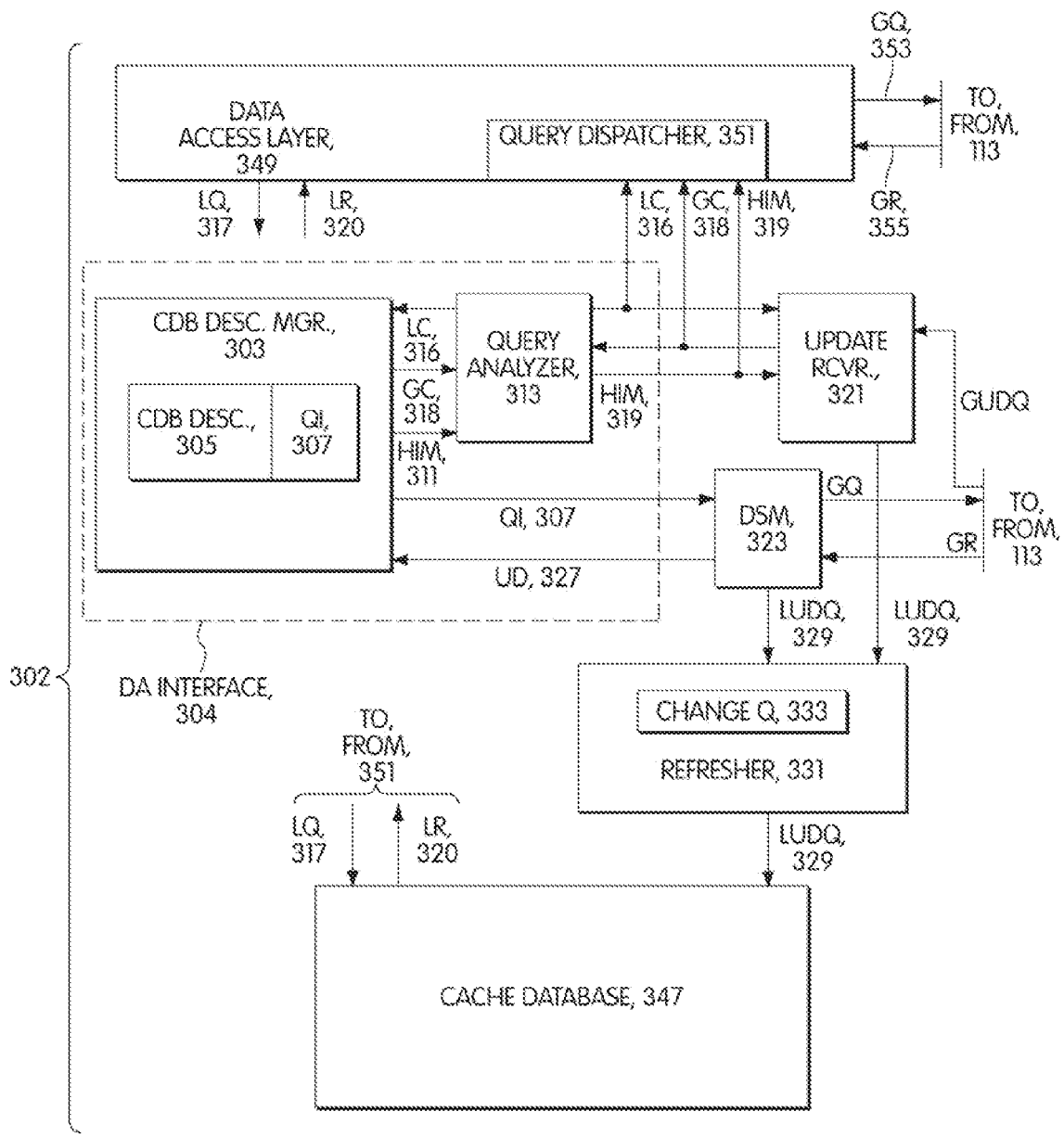
FIG. 3 is a detailed block diagram of details of an implementation of a server 203($i$)
Figure 5:
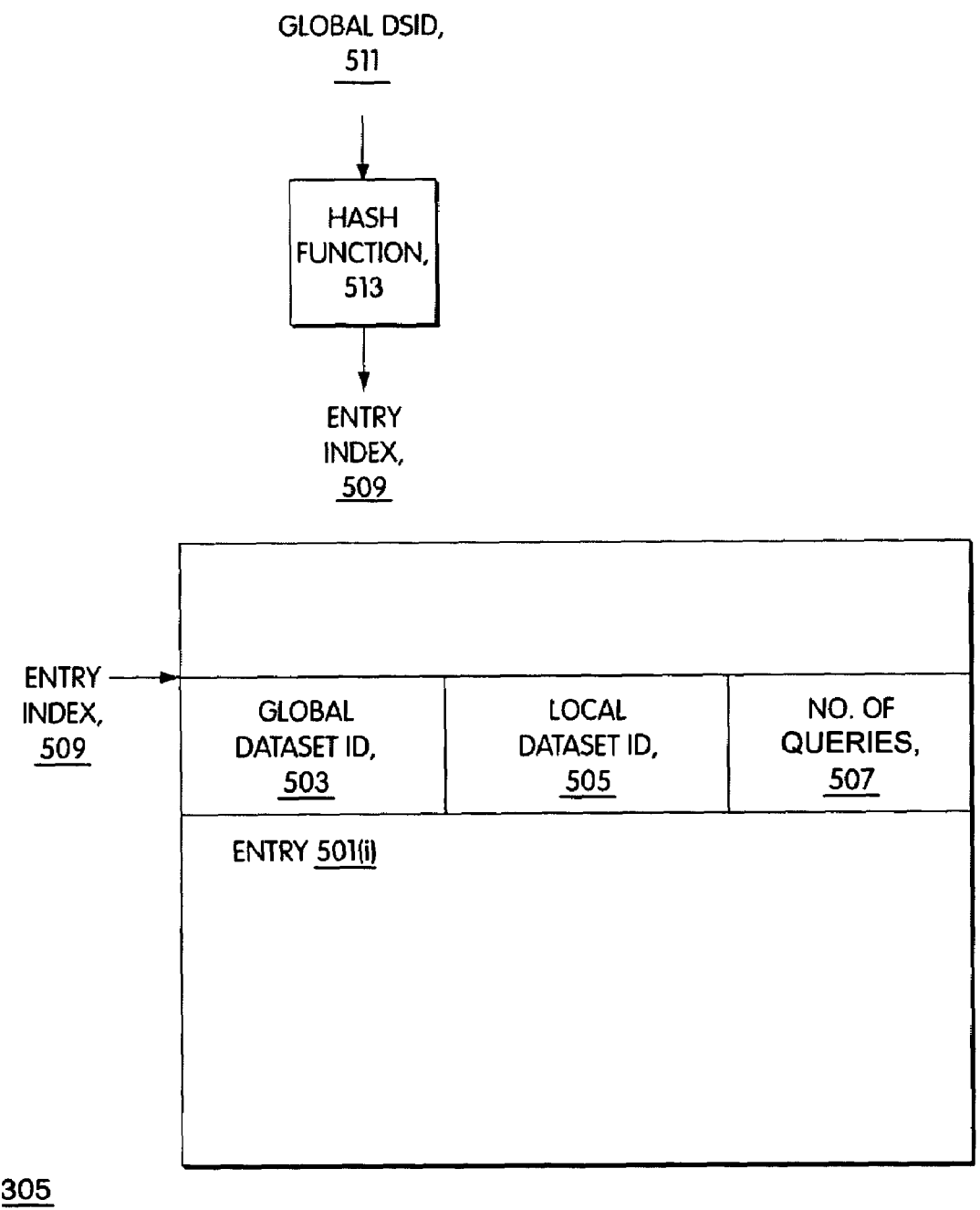
FIG. 5 is a detail of cache database description 305.
Figure 6:
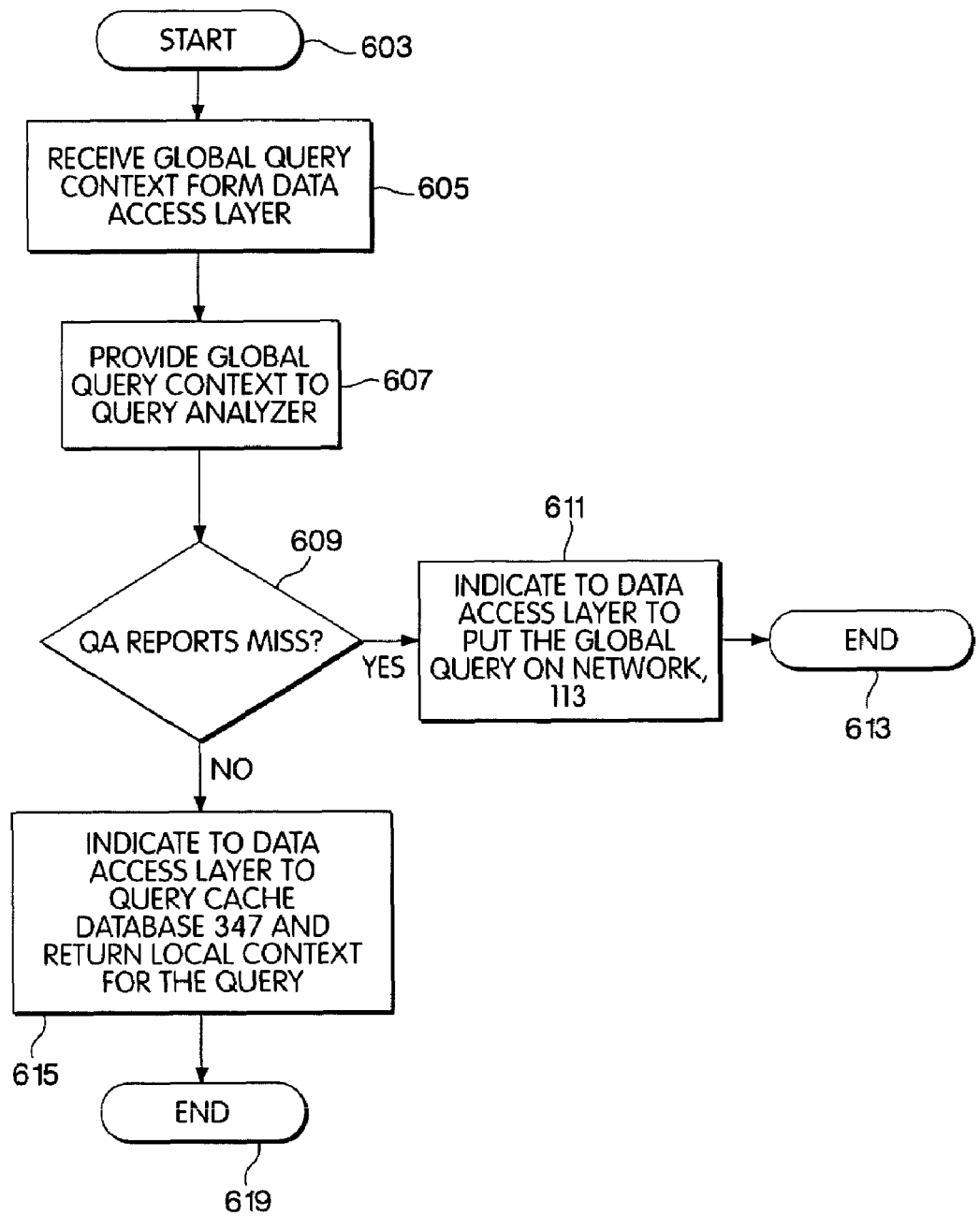
FIG. 6 is a flowchart of the operation of query dispatcher 351

Details of a Preferred Embodiment of a Data Access Layer and a Queryable Cache: FIGS. 3, 5, and 6

FIG. 3 shows a preferred embodiment 301 of data access layer 349 and queryable cache 302. Corresponding components of FIGS. 2 and 3 have the same names. Cache database 347 in embodiment 301 is an Oracle8 Server, which is described in detail in Leverenz, et al., *Oracle8 Server Concepts*, release 8.0, Oracle Corporation, Redwood City, Calif., 1998. In preferred embodiment 301, Web application program 111 uses global data set identifiers in queries. The Web application programs 111 in all of the servers 203 use the same set of global data set identifiers. A cache database 347 in a given server 203 has its own set of local data set identifiers for the data sets cached in cache database 347. In preferred embodiment 301, then, one may speak of global queries and query contexts that use global data set identifiers and local queries and query contexts that use local data set identifiers. In the preferred embodiment, query analyzer 313 uses cached database description (CDB DESC) 305 to translate global query contexts into local query contexts.

Data access layer 349 includes a new component, query dispatcher 351, which is the interface between data access layer 349 and queryable cache 302. FIG. 6 is a flowchart 601 of the operation of query dispatcher 351 in a preferred embodiment. Reference numbers in parentheses refer to elements of the flowchart. When data access layer 349 is preparing to query source database 241, it provides the global context for the query to query dispatcher 351 (605), which in turn provides global context 318 (FIG. 3) to query analyzer 313 (607). Query analyzer 313 determines whether the datasets identified by the global context are cached in cache database 347; if they are not, query analyzer 313 reports a miss 319 to query dispatcher 351 (609), which indicates to data access layer 349 that it is to place the global query (GQ) 353 on network 113.

If the datasets identified by the global context are cached in cache database 347, query analyzer 313 indicates that fact to query dispatcher 351 and also provides query dispatcher 351 with local context 316 for the datasets in cache database 347 (615). Query dispatcher 351 then provides the local context to data access layer 349, which uses the local context to make a local query 317 corresponding to the global query and then uses the local query to obtain local result 320 from cache database 347. It should be noted here that the operations involved in the translation from the global query to the local query and applying the local query to cache database 347 may be divided among data access layer 349, query dispatcher 351, and query analyzer 313 in many different ways; the advantage of the technique of flowchart 601 is that data access layer 349 can employ the same mechanisms to make local queries as it does to make global queries. All query analyzer 313 and query dispatcher 351 need do is supply data access layer 349 with the local context needed to make the local query.

Continuing with the details of queryable cache 302 and beginning with DA interface 304, interface 304 receives a global context 318 from query dispatcher 351 and depending on whether the datasets for the queries are in cache database 347, provides either local context 316 or a miss signal 319. DA interface 304 has two main components: query analyzer 313 and cache database description manager (CDB) 303.

Query analyzer 313 analyzes global contexts received from data access layer 253 and other components of embodiment 301 to obtain the global context's global dataset identifiers. Having obtained the global dataset identifiers, query analyzer 313 provides them to CDB description manager 303, which looks them up in cache database description 305. Cache database description 305 is a table of datasets. At a minimum, there is an entry in the table for each dataset that has a copy in cache database 347. Each such entry contains the dataset's global identifier and its local identifier. The table also contains query information (QI) 307. CDB description manager 303 then returns an indication of whether the dataset is in cache database 347 (H/M 311). If it is not, the query cannot be run on cache database 347, but must be run on source database 241, and consequently, query analyzer 313 returns a miss signal 319 to query dispatcher 351. If the query can be run on cache database 347, query analyzer 313 returns a hit signal 319 and also returns local context 316 for the query. As indicated above, query dispatcher 351 then provides local context 316 to data access layer 349, which uses it to make local query 317 on cache database 347. Cache database 347 then returns local result 320 to data access layer 349.

FIG. 5 shows details of CDB description 305. In a preferred embodiment, it is a table which has at least an entry 501 for each dataset of source database 241 of which here is a copy in cache database 347. Each entry 501 contains the global dataset identifier 503 for the data set, by which the dataset is known in all servers 107 with queryable caches 219 containing copies of the dataset, the local data set identifier 505, by which the dataset is known in cache database 347, and number of queries 507, which indicates the number of times the dataset has been queried over an interval of time. In the preferred embodiment, number of queries 507 embodies query information 307.

An entry 501(*i*) for a given dataset is accessed in a preferred embodiment by a hash function 503, which takes global dataset ID (global DSID) 511 for the dataset and hashes it into an entry index 509 in table 305. CDB description manager 303 then searches table 305 for the entry 501 whose field 503 specifies global DSID 511 beginning at entry index 509. If no such entry is found, the dataset is not in cache database 347 and CDB description manager 303 signals a miss 311 to query analyzer 313. Table 305 may also include entries 501 for global datasets that are not presently cached in cache database 347; in such entries, local dataset ID 505 has a null value and a miss is returned in response to the null value. The purpose of such entries is to maintain number of queries information 507 for such data sets, so that dataset manager 323 can determine whether to add the entry's dataset to cache database 347.

Update Revr 321 receives update queries provided by source database server 237 from data access 253 and uses query analyzer 313 to determine whether the dataset affected by the update is in cache database 347. If it is not, update revr 321 ignores the update; otherwise, it places local update query 329 in change queue 333. Refresher 331 reads queue 333 and executes its queries.

Data store manager 323 uses query information 307 in CDB description 305 to determine what datasets to add to or delete from cache database 347. With datasets to be added, DSM 323 makes the necessary queries to source database 241 and when the results arrive, DSM 323 makes them into update queries 329 and provides the update queries 329 to change queue 333, from which they are executed by refresher 331 as described above. DSM 323 further updates CDB description 305 as required by the changes it makes in cache database 347, as shown at 327.

In a preferred embodiment, DSM 323 and refresher 331 have their own threads or processes. It should also be pointed out here that CDB description 305 and change queue 333 could be implemented as database tables in cache database 347. Because these components are implemented independently of cache database 347 and because DA Interface 304 is used as an interface to cache database 347, embodiment 301 is to a large extent independent of the particular kind of database system employed to implement cache database 347. In embodiment 301, data access layer 349 only provides read queries to data access interface 304. All update queries go directly to server 237, without the update being entered in cache database 347. In other embodiments, queryable cache 219 may be implemented as a writethrough cache, i.e., the update may be entered in cache database 347 and also sent to server 237. It should be pointed out here that most Web application programs are mostly-read applications, that is, a Web user typically spends far more time reading information than he or she does changing it. For instance, in Web commerce, the "shopping" is mostly a matter of reading HTML pages, with updates happening only when the user adds something to his or her "shopping cart" or makes his or her purchases. In a system such as system 201, only making the purchases would typically involve an update of source database 241.

Figure 4:
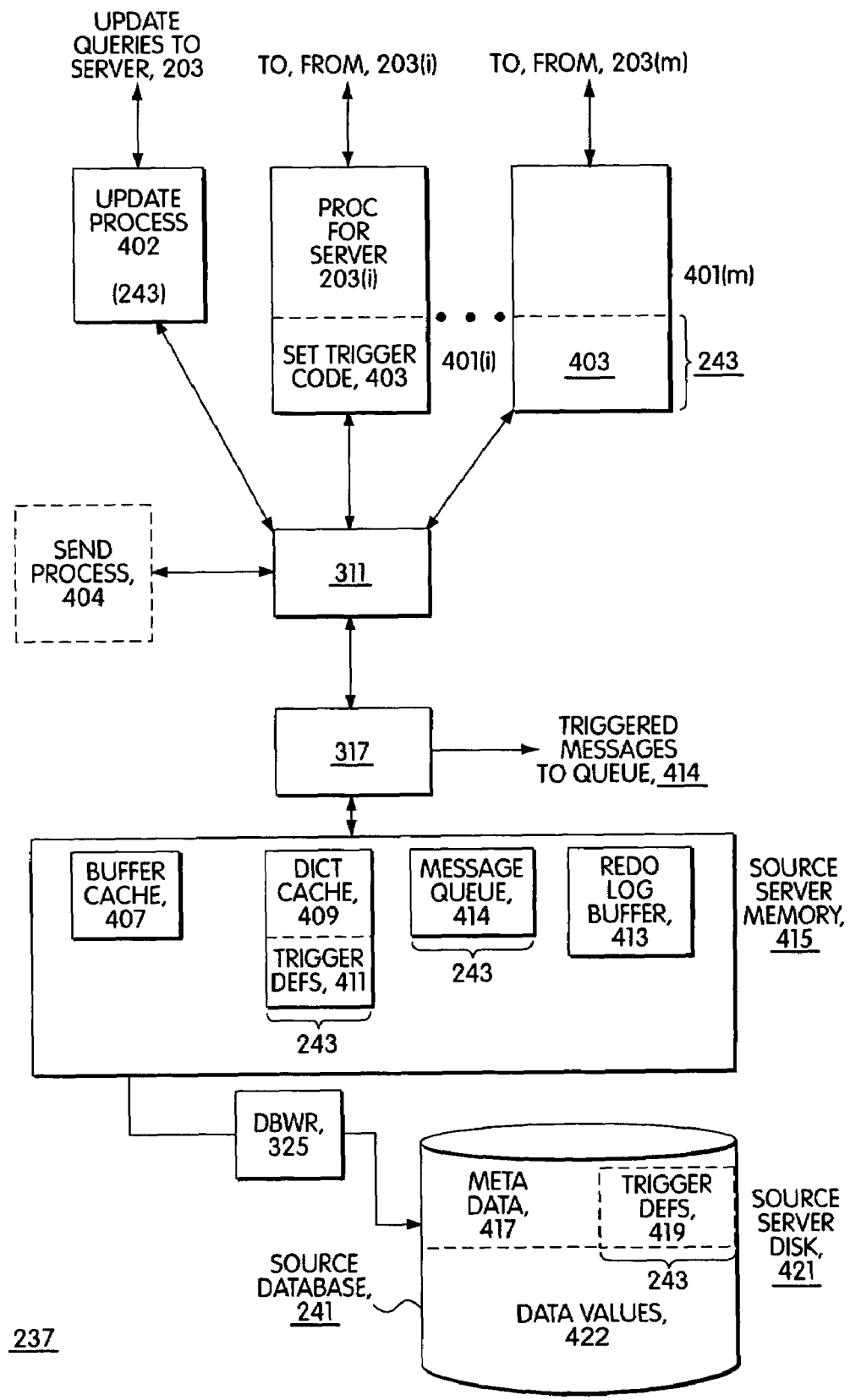
FIG. 4 is a detailed block diagram of details of an implementation of source database server 237.

Details of Source Database Server 237: FIG. 4

FIG. 4 shows a preferred embodiment of source database server 237. Source database server 237 in the preferred embodiment is implemented by means of an Oracle8 server executing on a computer system that includes a source server disk 421 on which is stored source database 241 and source server memory 415 which contains buffer cache 407 for copies of data values 422 from source database 241 and dictionary cache 409 for copies of metadata from source database 241. Metadata is database tables whose contents describe the data in the database. Writebacks of cached data in source server memory 415 to source database 241 are handled by database write process 325. Each of processes 401(0 ... n) represents and corresponds to a server 203(0 ... n) and handles queries resulting from cache misses, update queries, and queries from DSM 323 in the corresponding server 203. Two such processes, 401(i) and 401(n), are shown in FIG. 4. Dispatcher 311 gives each of these processes in turn access to shared server process 317, which performs the actual queries and returns the results to the querying process, which in turn returns the results via network 235 to its corresponding server 203.

The Oracle8 implementation of source database server 237 is a standard Oracle8 database system to which has been added an implementation of update transmitter 243 which automatically sends an update to queryable cache 219 in each of the servers 203(0 ... n) when data in source database 241 that has been copied to cached data 223 changes. The components of updater 243 in FIG. 4 are labeled with the reference number 243 in addition to their own reference numbers. The implementation of updater 243 in the preferred embodiment employs database triggers. A database trigger is a specification of an action to be taken if a predefined change occurs in a data value or an item of metadata in the database. Definitions of the triggers are kept on source server disk 421 in trigger defs 419; when a trigger is in use, it is in source server memory 415, as shown at trigger defs 411. Many database systems permit definition of triggers; triggers in the Oracle8 database system are described in detail at pages 17-1 through 17-17 of the Leverenz reference.

In the preferred embodiment, when a process 401(i) corresponding to a server 203(i) receives a query from DSM 323 in server 203(i) for data to be added to server 203(i)'s cached data 223, process 401(i) executes set trigger code 403. This code sets an Oracle8 AFTER row trigger in metadata 417 for each row of data and/or metadata specified in the query. Shared server process 317 takes the action specified in the trigger whenever the trigger's now of data has been modified. The action specified for the trigger is to send a message to each of the servers 203(0 ... n) with an update query that modifies the data in cached data 223 in the same fashion as it was modified in source database 241. In the preferred embodiment, the action performed by the trigger is to place the message with the update query in message queue 414, which is implemented as an Oracle8 advanced queue. Message queue 414 is read by update process 402, which sends the messages in queue 414 to each of the servers 203(0 ... n).

Adding new data to cached data 223 in response to or in anticipation of changes in the behavior of the users of internet 105 and updating cached data 223 in response to changes in source database 241 may of course be implemented in many other ways in the preferred embodiment shown in FIGS. 3 and 4. For example, determining what data should be in cached data 223 could be done in source DBS server 237 instead of in each of the servers 203. Source database 241, like the cached database 347 in the servers 203(0 ... n), can maintain statistics information, and a send process 404 in source server 237 can analyze the statistics in substantially the same fashion as described for DSM 323, determine what data should be sent to the servers 203(0 ... n) for caching in cached data 223, make update queries for that data, and place messages containing the update queries in message queue 414, from which update processes 402 can send them to the servers 203.

Updating cached data 223 in response to changes in source database 241 can also be implemented without triggers. The Oracle8 database system includes a redo log buffer 413 in source server memory 415 which is a circular buffer of updates that have been performed on source database 241. The database system maintains the log so that it can redo updates in case of system failure, but the log can also be used to update cached data 223. If there is a table in source database 241 which describes cached data 223, update process 402 can use the table in conjunction with redo log buffer 413 to determine whether an update in redo log affects cached data 223. If it does, update process 402 can send a copy of the update query to the servers 203 as just described.

Caching Servers and Source Servers That Do Not Involve Database Systems

The techniques used to determine what data should be cached in server 203 and to update cached data 223 can also be employed in systems where the data is not queryable. For example, the source data may simply be a collection of documents, identified perhaps by a document number (such as its URL, if the document is an HTML page), and the cached data may be simply a subset of the collection. What cache Web application program 111 would receive from HTML component 109 in such a system would simply be the document number for a document; if it is present in the cached data, the caching server would return it from there; otherwise, it would fetch it from the source server. Querying log 205 in such a case would be a time-stamped list of the documents that had been requested, together with an indication of whether the document was in the cached data. DSM 213 in such an embodiment would determine as described above for the database whether a document should be included in the cached data, and having made the determination, would obtain it from the source server. As also described above, a send component on the source server could make the same determination and send the document to the caching servers.

For update purposes, the source server would simply maintain a list of the documents that were presently in the caching servers; if one of the documents on the list was updated, updater 243 would send the new versions of the document to the caching servers, where DSM 213 would replace any copy of the document in the cache with the new copy. The techniques just described for documents could of course also be used with files and with audio, image, and motion picture data.

CONCLUSION

The foregoing Detailed Description has described a Web server which implements the principles of the inventions set forth herein. The inventions are of course not limited to Web servers, but may be used in any situation where a cache needs to be kept coherent with the source of the cached data, where there is a need to determine what is going to be cached, where it is desirable to query the cached data, and where it is desired to make the cache transparent to programs running at a higher level. While the inventors have disclosed the best mode presently known to them of implementing their inventions, it will be immediate apparent to those skilled in the arts to which the inventions pertain that there are many other ways of implementing the principles of the inventions.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. Apparatus for responding to a request, the request including one or more specifiers referring to objects belonging to a plurality of objects thereof in a distributed database system that includes a plurality of database systems, the plurality including a first database system and a second database system and the apparatus comprising:
    a query analyzer that determines whether the request includes a specifier that cannot be interpreted in the first database system; and
    a redirector which responds to the request when the query analyzer determines that the request includes the specifier that cannot be interpreted in the first database system by causing the request to be executed at least in part in the second database system,
    the request being executed in the first database system when the query analyzer does not determines that the request includes the specifier that cannot be interpreted in the first database system.

2. The apparatus in accordance with claim 1 wherein:
    the objects in the first database system include copies of objects contained in at least one other database system belonging to the distributed database system.

3. The apparatus in accordance with claim 2 wherein:
    the first database system functions as a cache with regard to the objects whose copies are included in the first database system.

4. The apparatus in accordance with claim 2 wherein:
    the other database system is the second database system.

5. The apparatus in accordance with claim 4 wherein:
    the first database system functions as a cache with regard to the second database system.

6. The apparatus in accordance with any one of claims 1, 2, 3, 4, and 5 wherein:
    the apparatus is local to a server of the type that provides a program executing on the server with a standard interface for querying databases; and
    the requests include queries received via the standard interface.

7. The apparatus in accordance with claim 6 wherein:
    the server obeys the hypertext transfer protocol (http) and the program is a Web application program.

8. A method of responding to a request in a distributed database system that includes a plurality of database systems, the request including one or more specifiers that refer to one or more objects in the distributed database system and the plurality of database systems including a first database system and a second database system,
    the method comprising the steps of:
    determining whether the request includes a specifier that cannot be interpreted in the first database system; and
    causing the request to be executed at least in part in the second database system when the request includes the specifier that cannot be interpreted in the first database system.

9. The method in accordance with claim 8 wherein:
    the objects in the first database system include copies of objects contained in at least one other database system belonging to the distributed database system,
    whereby the first database system functions as a cache with regard to the objects whose copies are included in the first database system.

10. The method in accordance with claim 9 wherein:
    the other database system is the second database system,
    whereby the first database system functions as a cache with regard to the second database system.

11. The method in accordance with any one of claims 8, 9, and 10 wherein:
    the first database system is local to a server of the type that provides a program executing on the server with a standard interface for querying databases; and
    the request is made via the standard interface.

12. The method in accordance with claim 11 wherein:
the server obeys the hypertext transfer protocol (http) and the program is a Web application program.

13. A computer readable medium with program instructions for responding to a request in a distributed database system that includes a plurality of database systems, the request including one or more specifiers that refer to one or more objects in the distributed database system and the plurality of database systems including a first database system and a second database system,
comprising instructions for:
  determining whether the request includes a specifier that cannot be interpreted in the first database system; and
  causing the request to be executed at least in part in the second database system when the request includes the specifier that cannot be interpreted in the first database system.

14. Apparatus for caching copies of objects belonging to a subset of the objects belonging to a first database system that returns an object in response to a request therefor, the request including one or more specifiers referring to the objects and the apparatus comprising:
  a second database system that contains the copies;
  a query analyzer that determines whether the request includes a specifier that cannot be interpreted in the second database system; and
  a redirector that responds to the request when the query analyzer determines that the request includes a specifier that cannot be interpreted in the second database system by causing the request to be executed at least in part in the first database system, the request being executed in the second database system when the query analyzer does not determine that the request includes the specifier that cannot be interpreted in the second database system.

15. The apparatus in accordance with claim 14 wherein:
the apparatus is local to a server of the type that provides a program executing on the server with a standard interface for querying databases; and
the requests include queries received via the standard interface.

16. The apparatus in accordance with claim 15 wherein:
the server obeys the hypertext transfer protocol (http) and the program is a Web application program.

17. A method of responding to a request that includes one or more specifiers referring to one or more objects belonging to a set of objects where the objects are stored in a first database system and copies of a subset of the set of objects are stored in a second database system,
the method comprising the steps of:
  determining whether the request includes a specifier that cannot be interpreted in the second database system; and
  causing the request to be executed at least in part in the first database system instead of in the second database system when the request includes the specifier that cannot be interpreted in the second database system.

18. The method in accordance with claim 17 wherein:
the second database system is local to a server of the type that provides a program executing on the server with a standard interface for querying databases; and
the request is made via the standard interface.

19. The method in accordance with claim 18 wherein:
the server obeys the hypertext transfer protocol (http) and the program is a Web application program.

20. A computer readable medium with program instruction for responding to a request that includes one or more specifiers referring to objects belonging to a set of objects where the objects are stored in a first database system and copies of a subset of the set of objects are stored in a second database system,
the method comprising the steps of:
  determining whether the request includes a specifier that cannot be interpreted in the second database system; and
  causing the request to be executed at least in part in the first database system instead of in the second database system when the request includes the specifier that cannot be interpreted in the second database system.

* * * * *

UNITED STATES PATENT AND TRADEMARK OFFICE
CERTIFICATE OF CORRECTION

PATENT NO. : 7,526,481 B1  Page 1 of 2
APPLICATION NO. : 09/294656
DATED : April 28, 2009
INVENTOR(S) : Cusson et al.

It is certified that error appears in the above-identified patent and that said Letters Patent is hereby corrected as shown below:

On page 2, in column 2, under "Other Publications", line 12, delete "Proceedins" and insert -- Proceedings --, therefor.

On page 2, in column 2, under "Other Publications", line 17, delete "Communica," and insert -- Communication, --, therefor.

On sheet 1 of 6, in Figure 1, below Round Trip 2, line 1, delete "INITATE" and insert -- INITIATE --, therefor.

In column 1, line 19, delete "the" and insert -- that --, therefor.

In column 2, line 11, delete "suer" and insert -- user --, therefor.

In column 3, line 6, delete "data base" and insert -- database --, therefor.

In column 3, line 18, after "30-11" insert -- . --.

In column 4, line 41, after "351" insert -- . --.

In column 5, line 42, delete "miss" and insert -- H/M --, therefor.

In column 5, line 42, after "216" insert -- indicating a miss --.

In column 5, line 56, after "query" insert -- (CQ) --.

In column 5, line 57, delete "data base" and insert -- database --, therefor.

In column 5, line 58, before "247," insert -- (CR) --.

In column 5, line 59, before "217." insert -- (R) --.

Signed and Sealed this

Thirteenth Day of July, 2010

David J. Kappos
*Director of the United States Patent and Trademark Office*

CERTIFICATE OF CORRECTION (continued)
U.S. Pat. No. 7,526,481 B1

In column 8, line 61, after "queries" insert -- information --.

In column 8, line 63, after "queries" insert -- information --.

In column 10, line 36, delete "now" and insert -- row --, therefor.

In column 10, line 61, delete "processes" and insert -- process --, therefor.

In column 11, line 21, delete "Querying" and insert -- Query --, therefor.

In column 11, line 34, delete "versions" and insert -- version --, therefor.

In column 12, line 12, in claim 1, delete "determines" and insert -- determine --, therefor.

In column 14, line 26, in claim 20, delete "instruction" and insert -- instructions --, therefor.